(12) United States Patent
Mayer et al.

(10) Patent No.: US 11,982,296 B2
(45) Date of Patent: May 14, 2024

(54) HYDRAULIC SYSTEM AND METHOD FOR OPERATING A HYDRAULIC SYSTEM

(71) Applicant: Schaeffler Technologies AG & Co. KG, Herzogenaurach (DE)

(72) Inventors: Carsten Mayer, Lohr a. Main (DE); Yunfan Wei, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/017,446

(22) PCT Filed: Jun. 10, 2021

(86) PCT No.: PCT/DE2021/100497
§ 371 (c)(1),
(2) Date: Jan. 23, 2023

(87) PCT Pub. No.: WO2022/017554
PCT Pub. Date: Jan. 27, 2022

(65) Prior Publication Data
US 2023/0340969 A1 Oct. 26, 2023

(30) Foreign Application Priority Data
Jul. 21, 2020 (DE) ..................... 10 2020 119 161.8

(51) Int. Cl.
*F16H 61/00* (2006.01)
*F15B 11/17* (2006.01)
(Continued)

(52) U.S. Cl.
CPC .......... *F15B 11/17* (2013.01); *F16H 57/0446* (2013.01); *F16H 61/0031* (2013.01);
(Continued)

(58) Field of Classification Search
CPC ............ F15B 11/17; F15B 2211/20584; F15B 2211/20592; F16H 61/0031; F16H 2061/0037; F16H 61/30
See application file for complete search history.

(56) References Cited

U.S. PATENT DOCUMENTS 7,401,465 B2 * 7/2008 Emmert .............. F16H 61/4017
60/430
8,042,672 B2 * 10/2011 Grethel ............... F16H 61/0021
192/85.61
(Continued)

FOREIGN PATENT DOCUMENTS

DE 102012113113 A1 3/2014
DE 102013114324 A1 3/2015
(Continued)

OTHER PUBLICATIONS

See Corresponding Search Report for International Application PCT/DE2021/100497.

*Primary Examiner* — Michael Leslie
(74) *Attorney, Agent, or Firm* — Davidson, Davidson & Kappel, LLC (57) ABSTRACT

A hydraulic system, in particular a hydraulic transmission controller, includes a first pump, which provides a large volumetric flow for a cooling and/or lubricating device at an outlet, and a second pump, which provides a high pressure for at least one hydraulic load at an outlet. The hydraulic system also includes an additional active valve, which is connected upstream of the cooling and/or lubricating device, is connected to a system pressure valve and to at least one hydraulic load to be boosted in such a manner that in a boost state, the outlets of the two pumps are connected to the hydraulic load to be boosted via a boost line.

20 Claims, 5 Drawing Sheets

(51) Int. Cl.
   *F16H 57/04*   (2010.01)
   *F16H 61/30*   (2006.01)
   *F16H 63/34*   (2006.01)

(52) U.S. Cl.
   CPC .... *F16H 61/30* (2013.01); *F15B 2211/20584* (2013.01); *F15B 2211/20592* (2013.01); *F16H 2061/0037* (2013.01); *F16H 63/3483* (2013.01)

(56) References Cited

U.S. PATENT DOCUMENTS

| | | | | |
|---|---|---|---|---|
| 8,668,468 | B2* | 3/2014 | Hwang | F16H 61/0025 417/253 |
| 9,115,731 | B2* | 8/2015 | Maurer | F16H 61/448 |
| 9,488,285 | B2* | 11/2016 | Maurer | F16H 61/0206 |
| 9,631,614 | B2* | 4/2017 | Kim | F04B 53/18 |
| 9,976,576 | B2* | 5/2018 | Brittan | F16D 48/02 |
| 10,508,730 | B2* | 12/2019 | Buchmann | F01M 1/02 |
| 11,668,389 | B2* | 6/2023 | Meid | F16H 61/0206 60/486 |
| 2008/0223683 | A1 | 9/2008 | Grethel | |
| 2012/0040792 | A1 | 2/2012 | Ito | |
| 2014/0064990 | A1 | 3/2014 | Jo et al. | |
| 2015/0075151 | A1 | 3/2015 | Wi | |
| 2018/0100578 | A1 | 4/2018 | Shimizu et al. | |
| 2023/0003213 | A1* | 1/2023 | Wei | F04B 17/03 |
| 2023/0151807 | A1* | 5/2023 | Wei | F04B 49/20 417/1 |

FOREIGN PATENT DOCUMENTS

| | | | |
|---|---|---|---|
| DE | 102015204673 B3 | 7/2016 | |
| DE | 112008000438 B4 | 3/2017 | |
| DE | 102017219198 A1 | 5/2019 | |
| DE | 102018130528 A1 | 6/2020 | |
| DE | 102019122694 A1 * | 2/2021 | ............. F15B 11/17 |

* cited by examiner

HYDRAULIC SYSTEM AND METHOD FOR OPERATING A HYDRAULIC SYSTEM

CROSS-REFERENCE TO RELATED APPLICATIONS

This application is the U.S. National Phase of PCT Appln. No. PCT/DE2021/100497 filed Jun. 10, 2021, which claims priority to DE 10 2020 119 161.8, filed Jul. 21, 2020, the entire disclosures of which are incorporated by reference herein.

TECHNICAL FIELD

The present disclosure relates to a hydraulic system, in particular a hydraulic transmission controller, comprising a first pump, which provides a large volumetric flow for a cooling and/or lubricating device at an outlet, and comprising a second pump, which provides a high pressure for at least one hydraulic load at an outlet. The present disclosure also relates to a method for operating such a hydraulic system.

BACKGROUND

From the German patent specification DE 11 2008 000 438 B4, a hydraulic system for controlling a dual clutch transmission working with wet clutches is known, which system has a pump for providing a system pressure in a supply line, a control valve device for individually pressurizing clutch actuators with pressure derived from the system pressure, depending on operating states modulated actuating pressure, and contains a system valve which, when the system pressure is reached, directs hydraulic fluid delivered by the pump into a return line, containing a cooling control valve for controlling the amount of hydraulic fluid delivered to the clutches, with an auxiliary pump being provided for delivering cooling liquid to the clutches as required and with the hydraulic fluid flowing through the return line can be fed directly to the clutches for cooling them. From the German patent DE 10 2015 204 673 B3, a hydraulic arrangement for a hydraulically actuated friction clutch with a volume flow source and a pressure booster is known, which translates a large volume flow with a low pressure into a smaller volume flow with a higher pressure.

SUMMARY

An object of the present disclosure is to functionally improve the efficiency when actuating at least one hydraulic consumer in a hydraulic system that comprises cooling and/or lubrication.

The object is achieved with a hydraulic system, in particular a hydraulic transmission controller, comprising a first pump, which provides a large volumetric flow for a cooling and/or lubricating device at an outlet, and comprising a second pump, which provides a high pressure for at least one hydraulic load at an outlet, in that in the hydraulic system, an additional active valve, which is connected upstream of the cooling and/or lubricating device, is connected to a system pressure valve and to at least one hydraulic load to be boosted in such a manner that in a boost state, the outlets of the two pumps are connected to the hydraulic load to be boosted via a boost line. The two pumps are advantageously driven by an electric motor. Both pumps can be driven by a common electric motor. The hydraulic consumer to be boosted is, for example, a clutch, a brake and/or a gear selector. Hydraulic transmission controls with electrified pumps are used in the course of the electrification or hybridization of motor vehicle drive trains. With the electrically driven pumps, sufficient volume flow with the necessary pressure must be provided in all operating states of the hydraulic system. Due to the claimed hydraulic connection, the first pump can be used advantageously together with the second pump in order to quickly pass through regions of the characteristic curve with a low pressure level. Depending on the type of transmission, dynamic improvements can be achieved on different hydraulic consumers. The transmission control can, for example, be used advantageously in combination with a dual clutch transmission, a two-speed e-axle or a multi-stage automatic transmission. Since the high volume flows required in the operation of the hydraulic system are supplied at low pressure via the first pump, the second pump can be made smaller, so that the average power consumption of the hydraulic system and advantageously also thermally critical motor currents of the electric drive of the pumps can be reduced. The boost function is only used for functions with low pressure, for example to fill a clutch that is to be actuated. During normal operation, the first pump is used to provide hydraulic medium for cooling and/or lubrication. Therefore, the first pump is also referred to as a cooling oil pump or low-pressure pump. The second pump is used to provide a high pressure required to actuate the hydraulic consumers and is therefore also referred to as a high-pressure pump. The term boost or boosting here means hydraulic amplification. In a dual clutch transmission, in particular a P2 dual clutch transmission, either the clutch actuation of the dual clutch when shifting or the separating clutch actuation when the engine is restarted, and in both cases the gear shift, can be accelerated by boosting. In the case of a two-speed electric axle, both clutches can advantageously be actuated in an accelerated manner when shifting gears by boosting. In the case of multi-step automatic transmissions or transmissions of a similar design; for example, without a converter but with a starting clutch, only one clutch/brake can be actuated in an accelerated manner due to the gear shifting during boosting, or, if a later-described connection with at least four non-return valves is used, several can also be actuated hydraulic consumers are actuated at an accelerated rate. In contrast to other variants, the volume flow from the first pump is not fed between a consumer control valve and the consumer to be boosted, but rather between a non-return valve and the consumer control valve. The hydraulic system also preferably comprises a parking lock module having a hydraulically actuated parking lock.

A preferred exemplary embodiment of the hydraulic system is characterized in that the additional active valve is designed as a 3/2-way valve to which the boost line is connected. In a first switching position, the outlet of the first pump is only connected to the cooling and/or lubrication. The boost line remains blocked. In the second switching position, the connection to cooling and/or lubrication is interrupted. The outlets of both pumps are then connected to the boost line. The 3/2-way valve is preferably actuated electromagnetically and is advantageously biased into its first position, in which the cooling and/or lubrication is mainly supplied by the first pump, which is also referred to as the cooling oil pump.

A further preferred exemplary embodiment of the hydraulic system is characterized in that the additional active valve is designed as a pressure control valve, wherein the boost line starts from a hydraulic branch which is arranged between the outlet of the first pump and the additional active valve. The pressure control valve is preferably designed as an electronically actuated proportional valve with a 2/2-way valve design. The pressure control valve, which is used as an additional active valve, is particularly preferably designed in the same way as a system pressure valve which is connected between the two outlets of the pumps. In an open position of the additional active valve, the first pump is connected to the cooling and/or lubrication while the boost line is blocked. In a closed position of the additional active valve, the cooling and/or lubrication is separated from the pumps. The pressure control valve is preferably biased into its open position. The pressure control valve is controlled with the pressure that prevails at the outlet of the first pump when it is being driven.

Another preferred exemplary embodiment of the hydraulic system is characterized in that the boost line is connected to a hydraulic branch between a consumer control valve and the hydraulic consumer to be boosted, wherein a non-return valve is arranged in the boost line, which blocks in the direction of the additional active valve. The consumer control valve is, for example, a pressure regulator, which is also referred to as a clutch valve.

Another preferred exemplary embodiment of the hydraulic system is characterized in that the hydraulic system is designed as a hydraulic transmission control of a transmission of the geared type automatic transmission without converter, with at least one clutch which has a rather low volume requirement and is operationally connected to a system pressure line, and is designed with at least one hydraulically actuated clutch or brake to be boosted. In a transmission of this type, there are multiple shifting clutches, and possibly a starting clutch and a separating clutch of a hybrid module. Gears are formed, for example, via different interconnections of planetary gear sets. As a rule, this also requires clutches with a high torque capacity and thus a high actuating force. With a typically uniform pressure level, this requires a high volume requirement. This can be significantly higher than with other clutches. In order to improve the shifting dynamics, it is sufficient, for example, to boost only this one clutch. The volume flow from the first pump is then advantageously introduced directly between the pressure control valve and the clutch to be boosted via a non-return valve. During boosting, the control valve does not act as a pressure reducer for the system pressure but as a pressure limiter for the boost pressure. In principle, however, the boosted clutch remains controllable. As soon as a flat branch of the clutch characteristic has been passed and the pressure rises, the active switching valve is returned to its initial position and the second pump resumes actuation of the previously boosted clutch.

Another preferred exemplary embodiment of the hydraulic system is characterized in that the boost line is connected to a hydraulic branch upstream of a consumer control valve of the hydraulic consumer to be boosted, wherein a non-return valve is arranged in the boost line, which blocks in the direction of the additional active valve. This provides the advantage that additional non-return valves, apart from the non-return valve in the boost line, can be dispensed with.

Another preferred exemplary embodiment of the hydraulic system is characterized in that the boost line is connected to a hydraulic branch which is assigned to at least two hydraulic consumers of a transmission to be boosted, which has at least one clutch to be boosted and/or at least one hydraulic gear selector to be boosted, preferably multiple hydraulic gear selectors to be boosted. In this way, the electrical energy required to operate the hydraulic system can be effectively reduced with a high degree of shifting comfort.

A further preferred exemplary embodiment of the hydraulic system is characterized in that the system pressure valve is arranged between the outlets of the two pumps. The system pressure valve is advantageously designed as an electromagnetically actuated proportional valve with a 2/2-way valve design and is preloaded in its open position. The system pressure valve is preferably controlled with the pressure that prevails at the outlet of the second pump. This pressure can also be referred to as high pressure.

A further preferred exemplary embodiment of the hydraulic system is characterized in that the two pumps are driven by electric motors, in particular driven jointly by an electric motor as a tandem pump. The two pumps feed in only one direction.

In a method for operating a hydraulic system as described above, the object specified above is alternatively or additionally achieved in that in the boost state both pumps supply the at least one hydraulic consumer to be boosted with hydraulic medium via the additional active valve.

BRIEF SUMMARY OF THE DRAWINGS

Further advantages, features and details of the present disclosure will be apparent from the following description, in which various exemplary embodiments are described in detail with reference to the drawing. In the figures.

DETAILED DESCRIPTION

Figure 1:
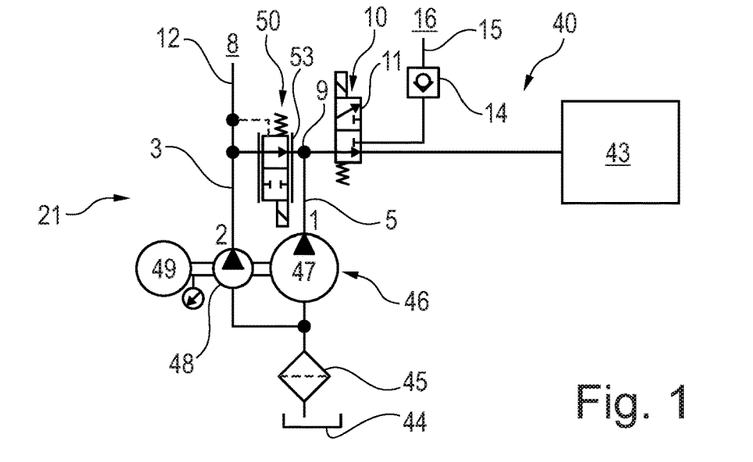
FIG. 1 shows a hydraulic system with a hydraulic module that comprises an electric motor-driven tandem pump with two pumps, a system pressure valve and an additional active valve to which a boost line is connected.
Figure 2:
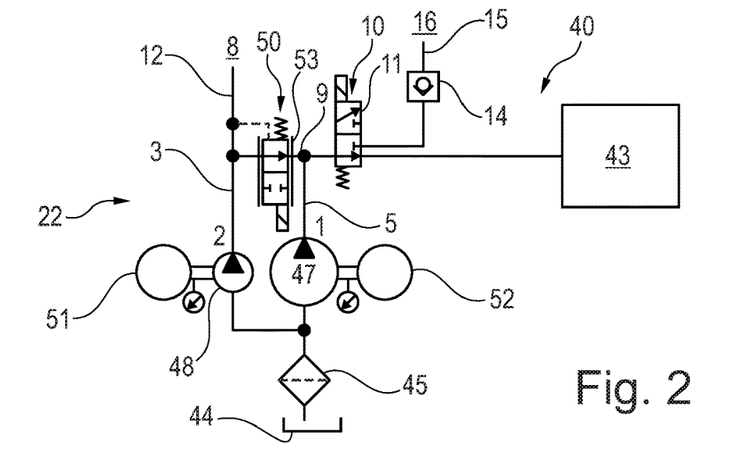
FIG. 2 shows a hydraulic system similar to that in FIG. 1, wherein the two pumps are each driven by a separate electric motor.
Figure 3:
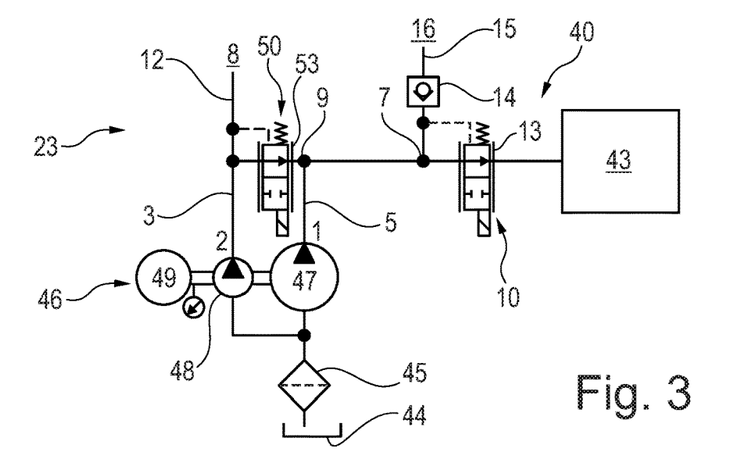
FIG. 3 shows a hydraulic system similar to that in FIG. 1, wherein the additional active valve is designed as a pressure control valve.

FIGS. 1 to 3 show exemplary embodiments of a hydraulic module 21; 22; 23. The same reference signs are used to denote identical or similar parts.

Figure 6:
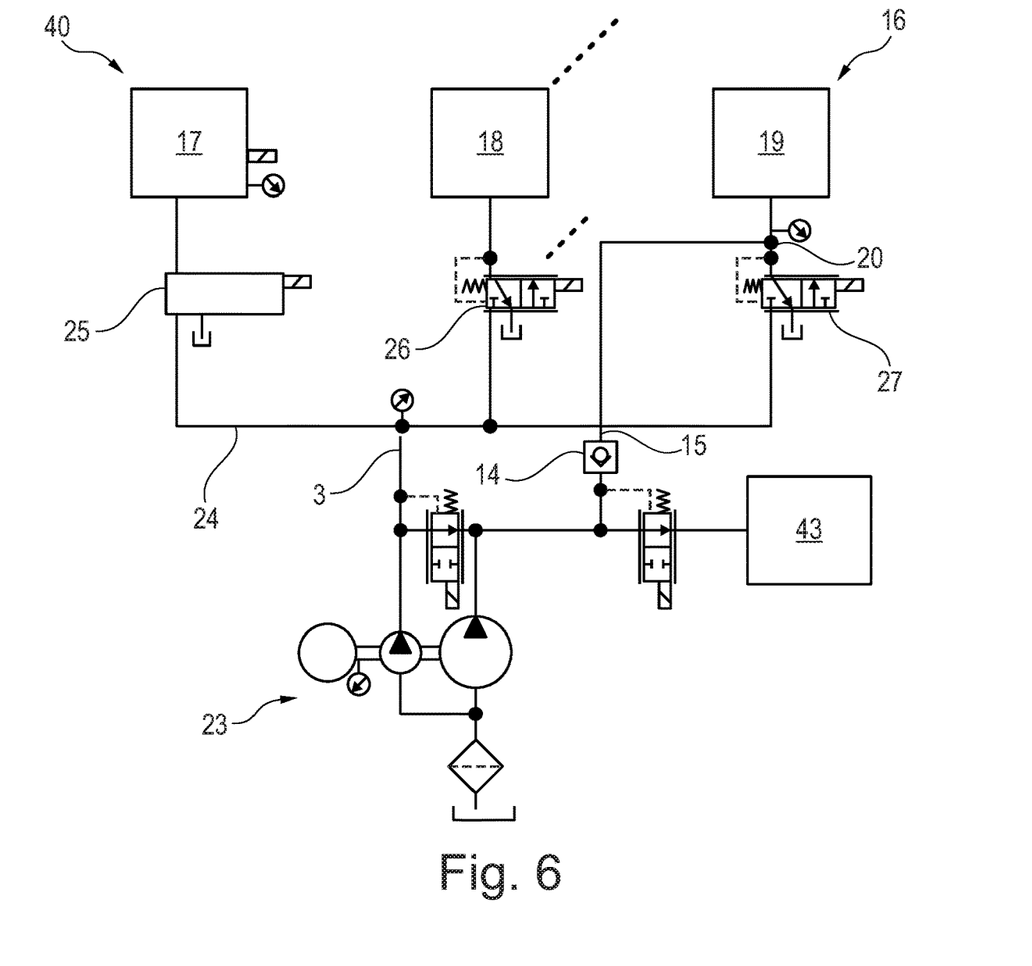
FIG. 6 shows a hydraulic system with a stepped automatic device with a clutch to be boosted with the hydraulic module from FIG. 3.
Figure 7:
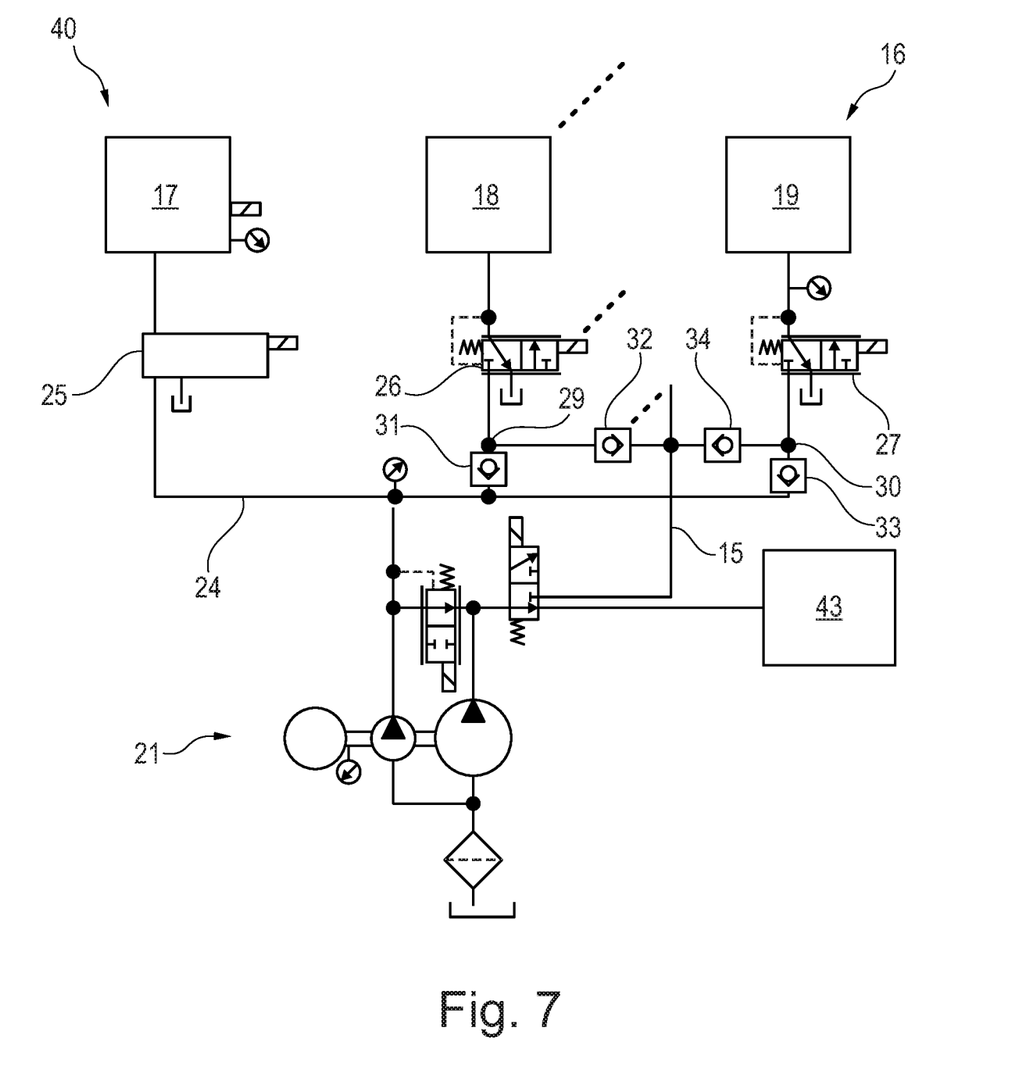
FIG. 7 shows a hydraulic system similar to that in FIG. 6 with a multi-step automatic device which comprises multiple clutches to be boosted, with the hydraulic module from FIG. 1.
Figure 8:
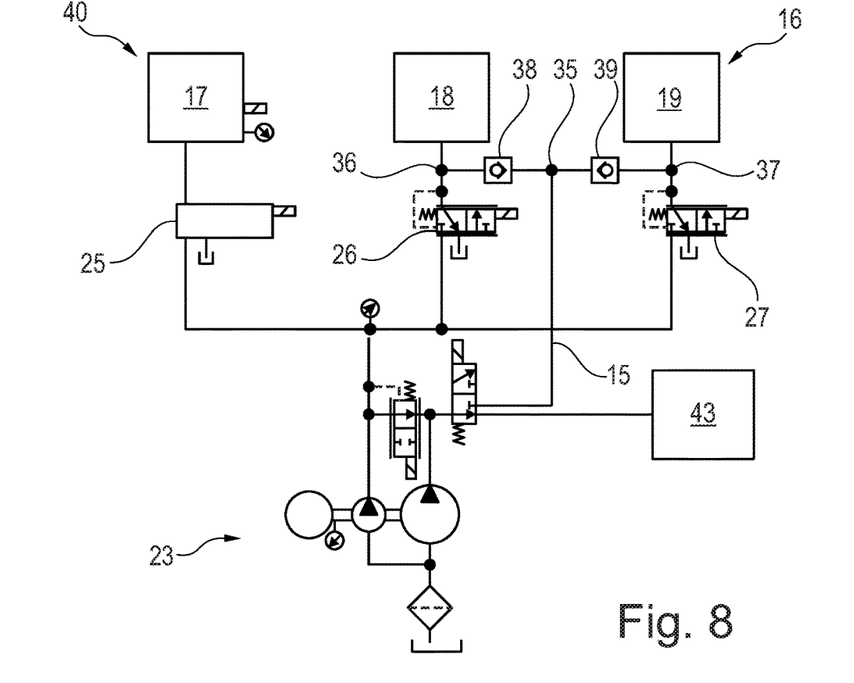
FIG. 8 shows a hydraulic system of a two-speed electric axle with the hydraulic module from FIG. 3.

The hydraulic module 21; 22; 23 is part of a hydraulic system 40, which is shown in its entirety in different embodiment variants in FIGS. 6 to 11. The hydraulic system 40 of FIGS. 6 and 8 is combined with the hydraulic module 23 from FIG. 3. The hydraulic systems 40 of FIGS. 7 and 9 to 11 are combined with the hydraulic module 21 from FIG. 1.

The hydraulic system 40 comprises cooling and/or lubrication 43. The cooling and/or lubrication 43 is supplied with hydraulic medium from a hydraulic medium reservoir 44, which is also referred to as a tank. The hydraulic medium is drawn in from the hydraulic medium via a suction filter 45 with two pumps 47, 48.

In FIGS. 1 and 3, the two pumps 46 and 48 are combined in a tandem pump. In the tandem pump, both pumps 47 and 48 are driven by a common electric motor 49.

In FIG. 2, the pump 47 is driven by an electric motor 52 while the pump 48 is driven by an electric motor 51.

As indicated by a large pump symbol, the pump 47 is designed to provide a large volume flow at a low pressure at an outlet 1. The second pump 48 is designed to provide a small volume flow at high pressure at an outlet 2.

A system pressure valve 50 is connected between the outlets 1 and 2 of the pumps 47, 48. The system pressure valve 50 is designed as an electromagnetically actuated proportional valve with a 2/2-way valve design and is biased into its illustrated open position, in which the two outlets 1, 2 of the two pumps 47, 48 are connected to one another. The system pressure valve 50 is controlled by a pressure that prevails in an actuation line 3. The actuation line 3 has a working connection 12 to which a hydraulic consumer in the form of a parking lock 8 is connected.

A volume flow line 5 for cooling and/or lubrication 43 extends from the outlet 1 of the first pump 47. An additional active valve 10 is arranged between the system pressure valve 50 and the cooling and/or lubrication 43. The volume flow line 5 comprises a hydraulic branch between the system pressure valve 50 and the additional active valve 10. A boost line 15 is connected to the additional active valve 10. A non-return valve 14 is arranged in the boost line 15 and opens toward at least one hydraulic consumer 16 to be boosted. In the opposite direction, the non-return valve 14 blocks.

The additional active valve 10 is designed as a 3/2-way valve or 3/2-way switching valve 11 in FIGS. 1 and 2. The 3/2-way valve comprises a connection to the hydraulic branch 9, a connection for cooling and/or lubrication 43 and a connection to the boost line 15.

In FIG. 3, the additional active valve 10 is designed as a pressure control valve 13 with a 2/2-way valve design. The pressure control valve 13 is arranged between the hydraulic branch 9 and the cooling and/or lubrication 43. The boost line 15 in FIG. 3 starts at a hydraulic branch 7 which is arranged between the hydraulic branch 9 and the pressure control valve 13.

The at least one hydraulic consumer 16 comprises, for example, friction elements such as clutches or brakes, in particular transmission brakes, which are generally also referred to below as clutches, or gear selectors with synchronous units.

Figure 4:
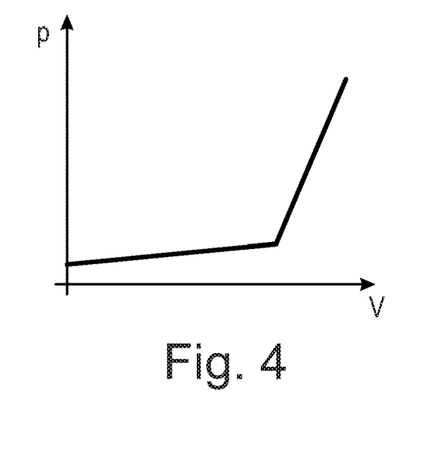
FIG. 4 shows a Cartesian coordinate diagram with a typical clutch characteristic.
Figure 5:
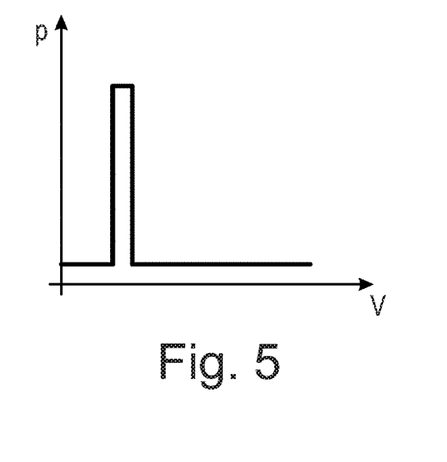
FIG. 5 shows a Cartesian coordinate diagram with a typical course of a gear actuation.

Two Cartesian coordinate diagrams are shown in FIGS. 4 and 5. A volume V is plotted in a suitable volume unit on an x-axis. A pressure p is plotted in a suitable pressure unit on a y-axis.

FIG. 4 shows a typical two-part clutch characteristic. The two-part clutch characteristic comprises a flat branch, in which the clutch is open and not engaged, and a steep branch, in which the clutch is closed and transmitting torque. The transition point between the flat branch and the steep branch of the clutch characteristic is called the contact point. The flat branch of the clutch characteristic is relatively long, so it requires a lot of volume to drive through in order to reduce drag losses and thus increase drivetrain efficiency. In order to actuate such a clutch quickly and thus achieve the desired shifting dynamics, a high volume flow is required at a comparatively low pressure.

FIG. 5 shows a typical course of a gear selector with synchronization when a gear is actuated. The gear selector characteristic in FIG. 5 comprises a short area of great force and therefore great pressure when synchronizing. Before that, and especially after that, the gear selector characteristic in FIG. 5 shows a large stroke without any pressure requirement worth mentioning. The respective areas with a large volume requirement at low pressure can be passed through more quickly using the claimed boost concept by connecting the outlets 1, 2 of both pumps 47, 48 to the at least one hydraulic consumer 16 to be boosted via the boost line 15 in a boost state.

The hydraulic system 40 in FIG. 6 comprises a parking lock module 17, which is connected to a system pressure line 24 with the interposition of a consumer control valve 25, which is also referred to as a parking lock valve. The system pressure line 24 is in turn connected to the actuation line 3.

At least one clutch 18 is also connected to the system pressure line 24, specifically with the interposition of a consumer control valve 26, which is also referred to as a clutch valve. The three points on the consumer control valve 26 and on the clutch 18 indicate that n clutches can each be connected to system pressure line 24 via a consumer control valve.

In addition, a clutch 19 to be boosted is connected to the system pressure line 24 with a consumer control valve 27 interposed. In FIG. 6, the clutch 19 to be boosted represents the hydraulic consumer 16 to be boosted. For this purpose, the boost line 15 is connected to a hydraulic branch 20 which is arranged between the consumer control valve 27 and the clutch 19 to be boosted.

In the hydraulic system 40 shown in FIG. 7, the boost line 15 is connected to a hydraulic branch 29 via a non-return valve 32 and to a hydraulic branch 30 via a non-return valve 34. The hydraulic branch 29 is assigned to the clutch 18 to be boosted in this case with the consumer control valve 26. The hydraulic branch 30 is assigned to the clutch 19 with the consumer control valve 27, which is also to be boosted.

A non-return valve 31 is arranged between the system pressure line 24 and the hydraulic branch 29. A non-return valve 33 is arranged between the system pressure line 24 and the hydraulic branch 30. The non-return valves 33 and 34 lock away from the hydraulic branch 30. The non-return valves 31 and 32 lock away from the hydraulic branch 29.

In FIG. 7, the boost volume flow is introduced upstream of the consumer control valves 26, 27. The non-return valves 31 to 34 are used to represent a hysteresis control for controlling the clutches 18, 19 to be boosted.

In the hydraulic system 40 in FIG. 8, the boost line 15 is connected to a hydraulic branch 35. The hydraulic branch 35 in turn is arranged between two hydraulic branches 36, 37. The hydraulic branches 36 and 37 are assigned to the two clutches 18, 19 to be boosted. Between the hydraulic branches 35, 36 and 35, 37 there is a non-return valve 38, 39 which blocks the hydraulic branch 35.

FIG. 8 shows a transmission of the 2-speed electric axle type. When this 2-speed electric axle is in operation, one of the clutches 18, 19 to be boosted is always closed. A starting clutch is not required. The boost volume flow is only supplied via the boost line 15 after the consumer control valves 26, 27, because when preparing a shift, i.e., when a clutch has to be brought to the touch point through the flat branch, the only other clutch has a significantly higher pressure level and thus over the respective non-return valve 38, 39 remains separated from the boost volume flow.

Figure 9:
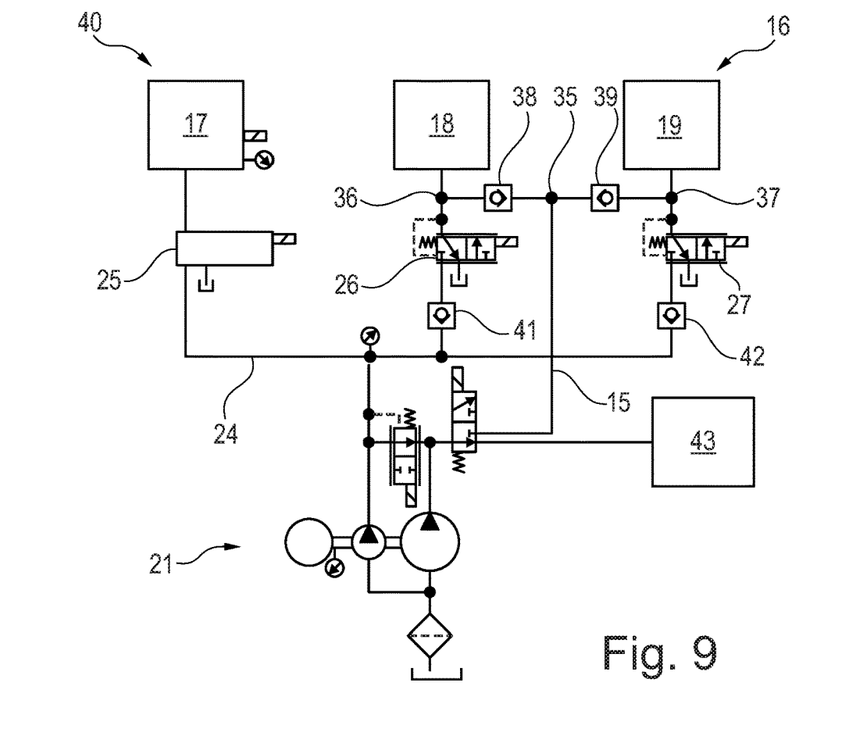
FIG. 9 shows a hydraulic system similar to that in FIG. 8 with the hydraulic module from FIG. 1 with a special control.

In the hydraulic system 40 in FIG. 9, in contrast to FIG. 8, two additional non-return valves 41, 42 are connected in front of the consumer control valves 26 and 27. The consumer control valves 26, 27 can be connected either to the boost line 15 or to the system pressure line 24 via the total of four non-return valves 38, 41 and 39, 42.

Figure 10:
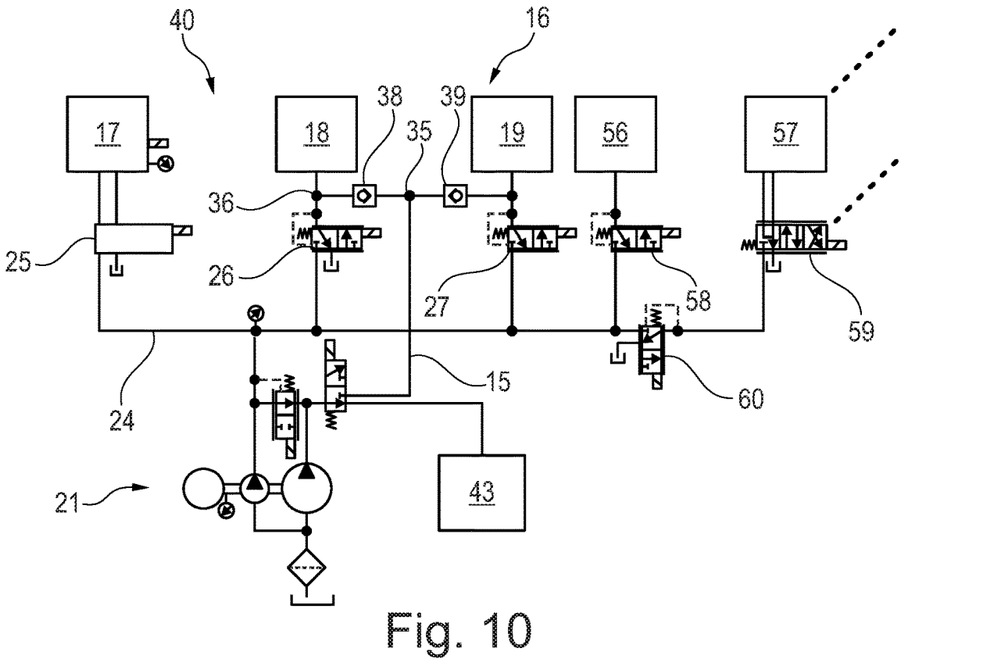
FIG. 10 shows a hydraulic system with a dual clutch to be boosted with the hydraulic module from FIG. 1.

In the case of dual clutch transmissions, in addition to at least one clutch, the gear actuators 57 that are typically controlled via directional valves can also be accelerated with the boost function. The gear actuators 57 in FIG. 10 are supplied via a common pressure control valve 60 upstream of the consumer control valve 59 in order to set the synchronizing force. Here, too, three points each indicate that n gear actuators 57 and n consumer control valves 59 can be provided.

A separating clutch 56 is connected to the system pressure line 24 via a consumer control valve 58. In FIG. 10, the boost line 15 is assigned to the two clutches 18, 19 to be boosted.

Figure 11:
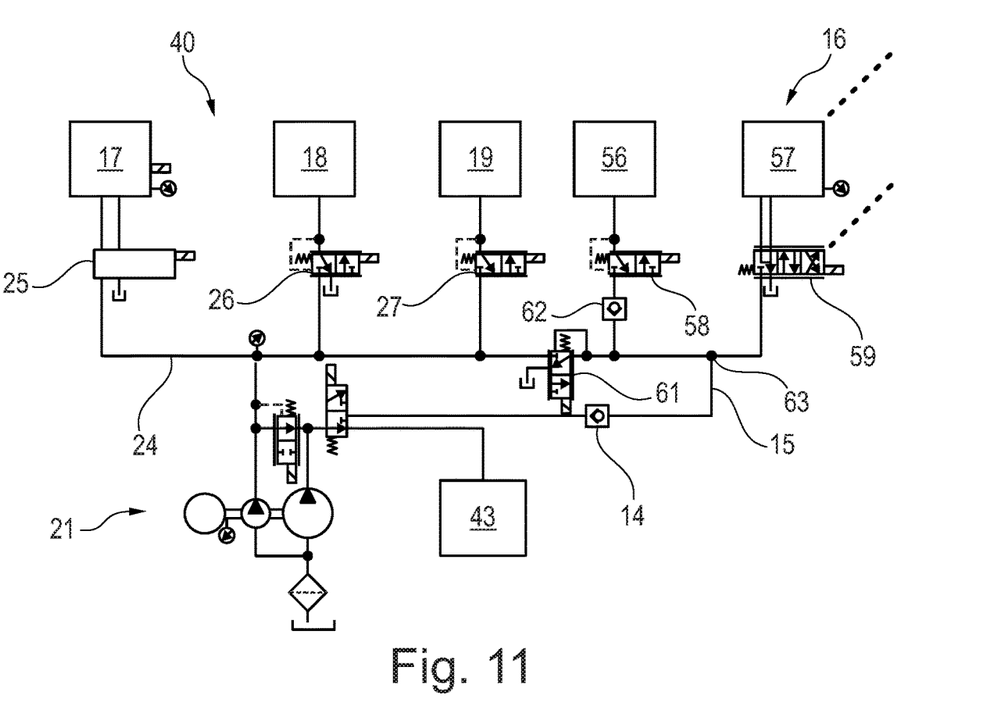
FIG. 11 shows a hydraulic system with a P2 dual clutch transmission with a separating clutch to be boosted and with the hydraulic module from FIG. 1.

In FIG. 11, the boost line 15 is connected to a hydraulic branch 63. The hydraulic branch 63 is arranged between the pressure control valve 61 and the consumer control valve 59. An additional non-return valve 62 is connected upstream of the consumer control valve 58. The additional non-return valve 62 blocks away from the consumer control valve 58.

The boost volume flow for the gear selectors 57 can be supplied via the boost line 15 and the common non-return valve 14. This exemplary embodiment corresponds to FIG. 11, but without the separating clutch 56 with the consumer control valve 58 and the non-return valve 62.

In FIG. 10, the non-return valves 38 and 39 make it possible to boost the respectively upcoming clutch 18, 19 of the dual clutch when shifting, but not when starting off. In this case, the dual clutch behaves like the 2-speed electric axle described above. However, it is not possible to use the boost volume flow before starting off, since both clutches would then be filled since both were previously open.

FIG. 11 shows how the separating clutch 56 and the gear selector 57 can be boosted. The separating clutch 56 can be boosted if the separating clutch 56 receives the volume flow from the gear selector area with the gear selectors 57 and the consumer control valve 59. A hysteresis operation is then run on the separating clutch 56 here.

LIST OF REFERENCE SIGNS

1 Outlet
2 Outlet
3 Actuation line
5 Volume flow line
7 Hydraulic branch
8 Parking lock
9 Hydraulic branch
10 Additional active valve
11 3/2-way valve
12 Working connection
13 Pressure control valve
14 Non-return valve
15 Boost line
16 Hydraulic consumers to be boosted
17 Parking lock module
18 Clutch
19 Clutch to be boosted
20 Hydraulic branch
21 Hydraulic module
22 Hydraulic module
23 Hydraulic module
24 System pressure line
25 Consumer control valve
26 Consumer control valve
27 Consumer control valve
29 Hydraulic branch
30 Hydraulic branch
31 Non-return valve
32 Non-return valve
33 Non-return valve
34 Non-return valve
35 Hydraulic branch
36 Hydraulic branch
37 Hydraulic branch
38 Non-return valve
39 Non-return valve
40 Hydraulic system
41 Non-return valve
42 Non-return valve
43 Cooling and/or lubrication
44 Hydraulic medium reservoir
45 Suction filter
46 Tandem pump
47 First pump
48 Second pump
49 Electric motor
50 System pressure valve
51 Electric motor
52 Electric motor
53 Pressure control valve
56 Separating clutch
57 Gear selector
58 Consumer control valve
59 Consumer control valve
60 Pressure control valve
61 Pressure control valve
62 Non-return valve
63 Hydraulic branch

What is claimed is:

1. A hydraulic system comprising:
    a first pump, which provides fluid at a first volumetric flow and a first pressure for a cooling and/or lubricating device at a first outlet;
    a second pump, which provides fluid at a second volumetric flow and a second pressure for at least one first hydraulic load at a second outlet, the first volumetric flow being greater than the second volumetric flow, the second pressure being higher than the first pressure;
    a system pressure valve; and
    an additional active valve connected upstream of the cooling and/or lubricating device, the additional active valve being connected to the system pressure valve and to at least one second hydraulic load to be boosted in such a manner that in a boost state, the first and second outlets being connected to the at least one second hydraulic load via a boost line.

2. The hydraulic system according to claim 1, wherein the additional active valve is a 3/2-way valve to which the boost line is connected.

3. The hydraulic system according to claim 1, wherein the additional active valve is a pressure control valve, wherein the boost line starts from a hydraulic branch which is arranged between the first outlet and the additional active valve.

4. The hydraulic system according to claim 1, wherein the boost line is connected to a hydraulic branch between a consumer control valve and the at least one second hydraulic load, wherein a non-return valve is arranged in the boost line, which blocks in a direction of the additional active valve.

5. The hydraulic system according to claim 4, wherein the hydraulic system is a hydraulic transmission control of a transmission of a geared automatic transmission without a converter with at least one clutch which is operationally connected to a system pressure line, and includes at least one hydraulically actuated clutch or brake to be boosted.

6. The hydraulic system according claim 1, wherein the boost line is connected to a hydraulic branch upstream of a consumer control valve of the at least one second hydraulic load, wherein a non-return valve is arranged in the boost line, which blocks in a direction of the additional active valve.

7. The hydraulic system according to claim 1, wherein the boost line is connected to a hydraulic branch which is assigned to at least two hydraulic consumers of a transmission to be boosted, which has at least one clutch to be boosted and/or at least one hydraulic gear selector to be boosted.

8. The hydraulic system according to claim 1, wherein the system pressure valve is arranged between the first and second outlets.

9. The hydraulic system according to claim 1, further comprising a first electric motor for driving the first pump and a second electric motor for driving the second pump.

10. A method for operating the hydraulic system according to claim 1, wherein in the boost state both the first and second pumps supply the at least one second hydraulic load with hydraulic medium via the additional active valve.

11. The hydraulic system according to claim 1, further comprising an electric motor for jointly driving the first and second pumps.

12. The hydraulic system according to claim 1, wherein the hydraulic system is a hydraulic transmission controller.

13. A hydraulic system comprising:
a first pump configured for providing fluid at a first volumetric flow and a first pressure at a first outlet to a cooling and/or lubricating device;
a second pump configured for providing fluid at a second volumetric flow and a second pressure at a second outlet to at least one first hydraulic load, the first volumetric flow being greater than the second volumetric flow, the second pressure being higher than the first pressure;
a system pressure valve connected between the first outlet and the second outlet; and
an additional active valve connected upstream of the cooling and/or lubricating device, the additional active valve being connected between the system pressure valve and at least one second hydraulic load for being boosted in such a manner that in a boost state, the additional active valve is configured for connecting the first and second outlets to the second hydraulic load.

14. The hydraulic system according to claim 13, wherein the system pressure valve is configured for being biased into an open position to connect the first outlet and the second outlet to each other, the system pressure valve being controlled by a pressure in an actuation line extending from the second pump.

15. The hydraulic system according to claim 13, further comprising a volume flow line extending from the first pump, the volume flow line including a hydraulic branch between the system pressure valve and the additional active valve.

16. The hydraulic system according to claim 13, further comprising a boost line connected to the additional active valve and a non-return valve arranged in the boost line and opening toward at least one second hydraulic load.

17. The hydraulic system according to claim 13, wherein the additional active valve is configured to have a first switching position in which the first outlet is only connected to the cooling and/or lubricating device.

18. The hydraulic system according to claim 17, wherein a boost line for connecting the first and second outlets to the second hydraulic load is blocked by the additional active valve when the additional active valve is in the first switching position.

19. The hydraulic system according to claim 18, wherein the additional active valve is configured to have a second switching position in which a connection of the first outlet to the cooling and/or lubricating device is interrupted.

20. The hydraulic system according to claim 19, wherein the first and second outlets are connected via the boost line to the second hydraulic load by the additional active valve when the additional active valve is in the second switching position.

* * * * *